(12) United States Patent
Ike et al.

(10) Patent No.: US 7,399,128 B2
(45) Date of Patent: Jul. 15, 2008

(54) CAMERA CONTROL SYSTEM

(75) Inventors: Takahiro Ike, Yokohama (JP); Yasuji Nakamura, Yokohama (JP); Tsuyoshi Ogata, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 219 days.

(21) Appl. No.: 10/544,190

(22) PCT Filed: Feb. 18, 2004

(86) PCT No.: PCT/JP2004/001832

§ 371 (c)(1),
(2), (4) Date: Aug. 2, 2005

(87) PCT Pub. No.: WO2004/075553

PCT Pub. Date: Sep. 2, 2004

(65) Prior Publication Data

US 2006/0133787 A1      Jun. 22, 2006

(30) Foreign Application Priority Data

Feb. 18, 2003     (JP)     ............................. 2003-039621

(51) Int. Cl.
   *G03B 17/00*     (2006.01)
(52) U.S. Cl. ........................... 396/427; 396/56; 396/58; 348/211.7; 348/211.8; 348/333.05
(58) Field of Classification Search ................... 396/56, 396/58, 427; 348/211.7, 211.8, 333.05
   See application file for complete search history.

(56) References Cited

U.S. PATENT DOCUMENTS 4,145,715 A * 3/1979 Clever .......................... 348/150

(Continued)

FOREIGN PATENT DOCUMENTS

EP           1 178 685           2/2002

(Continued)

OTHER PUBLICATIONS

Patent Abstracts of Japan vol. 1997, No. 11, Nov. 28, 1997 & JP 09-182059, Jul. 11, 1997, abstract.

*Primary Examiner*—W. B. Perkey
*Assistant Examiner*—Michael A Strieb
(74) *Attorney, Agent, or Firm*—Pearne & Gordon LLP

(57) ABSTRACT

Herein disclosed is an imaging system which can enhance its operational performance to allow an operator to easily obtain a good grasp of images collectively displayed on a screen by comprising: a camera (1) to be disposed in a remote place, the camera (1) having an optical axis (1*a*); driving means (8, 13) for driving the camera (1) to have the optical axis (1*a*) of the camera (1) moved in each of horizontal and vertical directions; position detecting means (10) for detecting a position of the optical axis (1*a*) of the camera (1)in each of the horizontal and vertical directions; position information storing means (12) for storing position information indicative of the position of the optical axis (1*a*) of the camera (1)to have the position information linked to an image taken at the position by the camera (1); and remote controlling apparatus (21) to be electrically connected to the driving means (8) through a communication network (19, 22) to control the driving means (8, 13), the remote controlling apparatus (21) including display means for displaying on the screen the image taken at the position by the camera (1) to have the screen linked to the position information.

8 Claims, 5 Drawing Sheets

U.S. PATENT DOCUMENTS

| | | | |
|---|---|---|---|
| 4,337,482 A * | 6/1982 | Coutta | 348/159 |
| 4,458,266 A | 7/1984 | Mahoney et al. | |
| 5,216,502 A * | 6/1993 | Katz | 348/150 |
| 5,450,140 A * | 9/1995 | Washino | 348/722 |
| 5,625,410 A * | 4/1997 | Washino et al. | 348/154 |
| 5,627,616 A * | 5/1997 | Sergeant et al. | 396/427 |
| 5,689,442 A * | 11/1997 | Swanson et al. | 380/241 |
| 5,923,364 A * | 7/1999 | Rhodes et al. | 348/159 |
| 6,587,046 B2 * | 7/2003 | Joao | 340/539.14 |
| 7,218,352 B2 * | 5/2007 | Hasegawa et al. | 348/333.05 |
| 2003/0025599 A1 * | 2/2003 | Monroe | 340/531 |
| 2004/0223058 A1 * | 11/2004 | Richter et al. | 348/207.1 |

FOREIGN PATENT DOCUMENTS

| | | |
|---|---|---|
| JP | 7-067098 | 3/1995 |
| JP | 8-298661 | 11/1996 |
| JP | 10-215398 | 8/1998 |
| JP | 11-242523 | 9/1999 |
| JP | 2001-069496 | 3/2001 |
| JP | 2002-016909 | 1/2002 |
| WO | 02/37856 | 5/2002 |
| WO | 02/45434 | 6/2002 |

* cited by examiner

CAMERA CONTROL SYSTEM

TECHNICAL FIELD OF THE INVENTION

The present invention relates to an camera control system, and more particularly to an camera control system for controlling a camera for taking images to be collectively displayed on a divided image section of a screen.

DESCRIPTION OF THE RELATED ART

Up until now, there have been proposed a wide variety of surveillance apparatuses of this type one typical example of which is installed in a specific area such as for example a convenience store, a home, and a bank to watch a suspicious person and the like. The conventional surveillance apparatus comprises a camera for taking images, driving means for driving the camera to have the camera moved within horizontal and vertical allowable ranges, communication means for transmitting image information indicative of the images taken by the camera, and a personal computer for displaying the image received from the communication means on its liquid crystal screen.

In a manual operation, the conventional surveillance apparatus thus constructed is manually operated by an operator in order to have the camera moved in each of horizontal and vertical directions, and to have the camera occupy a specific position, and to have the camera take an image at the specific position. The above mentioned conventional surveillance apparatus, however, encounters such a problem that it is laborious for an inexperienced operator to manually operate the conventional surveillance apparatus in order to have the camera moved to the specific position.

In a preset operation, the position information indicative of positions is firstly stored in the conventional imaging apparatus. The conventional imaging apparatus is then operated to allow the camera to be moved on the basis of the stored position information in order to have the camera take the image at each of the specific positions. The above mentioned conventional surveillance apparatus, however, encounters such a problem that it is tedious for the operator to judge whether or not each of the positions represented by the stored position information is right as a respective specific position.

In order to solve the above mentioned problems, there have been proposed a wide variety of camera control systems of this type one typical example of which is disclosed in Japanese Patent Laying-Open Publication No. 2002-16909 as comprising a camera, a camera platform for supporting the camera to ensure that the camera is movable in each of the horizontal and vertical directions, and a remote controlling apparatus for controlling the camera platform to allow the camera to be sequentially moved to the specific positions to ensure that the images are taken at the specific positions, displayed as a panoramic image on a screen.

The previously mentioned conventional camera control system can allow an operator to obtain a good grasp of the area by allowing the operator to watch the images collectively displayed on the screen as a panoramic image (surround image).

The conventional camera control system is adapted to allow the images taken at the specific positions to be collectively displayed on the screen as a panoramic image. This means that the conventional camera control system requires the position information indicative of the specific positions linked to the screen. The conventional camera control system thus constructed as previously mentioned, however, encounters such a problem that it is tedious for the operator to operate the remote controlling apparatus to have the position information linked to the screen under the conventional imaging apparatus being shared by operators.

DISCLOSURE OF THE INVENTION

It is, therefore, an object of the present invention to provide an camera control system which can enhance its operational performance with no initial setup on the specific positions each to be occupied by the camera to allow the operator to easily obtain a good grasp of the specific area through the images taken at the specific positions, and displayed on the image sections.

In accordance with one aspect of the present invention, there is provided an camera control system, comprising: a camera to be disposed in a remote place, the camera having an optical axis; driving means for driving the camera to have the optical axis of the camera moved in each of horizontal and vertical directions; position detecting means for detecting a position of the optical axis of the camera in each of the horizontal and vertical directions; position information storing means for storing position information indicative of the position of the optical axis of the camera to have the position information linked to an image taken at the position by the camera; and remote controlling apparatus to be electrically connected to the driving means through a communication network to control the driving means, the remote controlling apparatus including display means for displaying on a screen the image taken at the position by the camera to have the screen linked to the position information.

The camera control system thus constructed as previously mentioned can allow an operator to obtain a good grasp of the area by allowing the operator to watch the image displayed on the screen by reason that the position of the camera is automatically detected by the position detecting means when the camera is moved in the horizontal and vertical directions, the images being stored in conjunction with the positions each occupied by the camera, the images being sequentially taken by the camera to be displayed on the screen in conjunction with the detected position.

The camera control system thus constructed as previously mentioned can enhance its operational performance to take an image in an area without being tediously operated by an operator in an initial stage by reason that the position of the camera is automatically detected by the position detecting means.

In the camera control system according to the present invention, the screen has a divided image section. The display means is adapted to display images sequentially taken at the respective positions by the camera on the divided image section linked to the detected positions.

The camera control system thus constructed as previously mentioned can allow an operator to obtain a good grasp of the remote area by allowing the operator to watch the images displayed on the divided image section by reason that the position of the camera is automatically detected by the position detecting means when the camera is moved in the horizontal and vertical directions, the images being stored in conjunction with the positions each occupied by the camera, the images being sequentially taken by the camera to be displayed on the screen in conjunction with the detected position.

The camera control system according to the present invention further comprises position registering means for registering the position detected by the position detecting means with an optical condition of the camera. The driving means is adapted to drive the camera on the basis of the registered position and optical condition.

The camera control system thus constructed as previously mentioned can allow an operator to obtain a good grasp of the area by allowing the operator to easily watch preset images which are taken at respective positions to be collectively displayed on the divided image section by reason that the positions linked to the images, for example eight images taken at eight positions, to be displayed on the divided image section are previously registered with the optical condition (eight optical conditions of the respective positions) such as for example focus and magnification, the camera driving apparatus being controlled on the basis of the registered positions and optical conditions when the preset images are taken at the registered positions by the camera.

In the camera control system according to the present invention, the screen has an enlarged image section. The image switching means is, when one of the images displayed on the divided image section is selected, adapted to allow the camera to be moved and occupy a position linked to the selected image. The camera control system further comprises image switching means for allowing the display means to display a moving image taken at the selected position by the camera to have the moving image displayed on the enlarged image section.

The camera control system thus constructed as previously mentioned can, when the judgment is made that an image of a suspicious person is taken and displayed on the divided image section, display the image on the enlarged image section. This means that the camera control system thus constructed as previously mentioned can timely and easily switch the image between the enlarged image section and the divided image section to enhance the security.

In the camera control system according to the present invention, the remote controlling apparatus is adapted to control the driving means at regular time intervals to have the camera sequentially take images at the positions linked to the images displayed on the divided image section to allow the images displayed on the divided image section to be updated to the images taken by the camera.

The camera control system thus constructed as previously mentioned can allow an operator to watch the images collectively displayed on the divided image section, can be small in production cost, can allow only one camera to be moved and pointed at directions to take the images, and fully enhance the security by allowing the operator watch on an image taken in the suspicious and problematic direction by reason that the remote controlling apparatus is adapted to control the driving means at regular time intervals to have the camera sequentially take images at the positions linked to the images displayed on the divided image section to allow the images displayed on the divided image section to be updated to the images taken by the camera.

The imaging system according to the present invention image further comprises information storing means for storing image information indicative of the images taken by the camera at the positions to have the stored images linked to the respective positions.

The camera control system thus constructed as previously mentioned can be small in production cost, and reduce the memory capacity of the imaging information storing apparatus by reason that the camera control system according to the present invention further comprises image information storing means for storing image information indicative of the images taken by the camera.

In the camera control system according to the present invention, the remote controlling apparatus is adapted to control the driving means to have the camera take images at predetermined time intervals at the positions. The camera control system according to the present invention further comprises difference detecting means for detecting differences of the images in each position. The remote controlling apparatus is adapted to produce a notification signal on the differences detected by the difference detecting means.

The camera control system thus constructed as previously mentioned can be small in production cost, allow only one camera to be moved and pointed at directions to take the images, and fully enhance the security by allowing an operator to watch on an image taken in the suspicious and problematic direction by reason that the remote controlling apparatus is adapted to control the driving means to have the camera take images at predetermined time intervals at the positions, the camera control system further comprises difference detecting means for detecting differences of the images in each position, the remote controlling apparatus is adapted to produce a notification signal on the differences detected by the difference detecting means.

In the camera control system according to the present invention, the displaying means of the remote controlling apparatus is adapted to enlarge the image linked to a position in which the difference of the images is detected by the difference detecting means, and to display the enlarged image on the enlarged image section.

The camera control system thus constructed as previously mentioned can allow an operator to obtain a good grasp of the area by allowing the operator to watch the image taken at the direction of suspicious and problematic area, and fully enhance the security of that area.

In the camera control system according to the present invention, the remote controlling apparatus is adapted to obtain viewing angle information on a viewing angle of a lens unit of the camera to calculate a distance in each of the horizontal and vertical directions on the basis of the viewing angle information.

The camera control system thus constructed as previously mentioned can display as a panoramic image on the divided image section the images taken by the camera moved on the basis of the viewing angle information of each of the horizontal and vertical direction.

The camera control system thus constructed as previously mentioned can allow the panoramic images to be respectively delivered to users by reason that the images taken at respective positions by the camera stored in the image information storing means of the remote controlling apparatus.

In the camera control system according to the present invention, the remote controlling apparatus further includes inputting means for inputting descriptive information on the images taken at the respective positions, and the display means is adapted to superimpose the descriptive information inputted by the inputted means on the respective images to be displayed on the divided image section or the enlarged image section.

The camera control system thus constructed as previously mentioned can allow an operator to obtain a good grasp of the area by allowing the operator to watch the images displayed on the divided image section or the enlarged image section. This means that the camera control system according to the present invention can allow the operator to immediately rush to that area if necessary.

BRIEF DESCRIPTION OF THE DRAWINGS

The features and advantages of an camera control system according to the present invention will be more clearly under

DESCRIPTION OF THE PREFERRED EMBODIMENTS

The embodiments of the camera control system according to the present invention will now be described hereinafter in accordance with accompanying drawings.

First Embodiment

Figure 1:
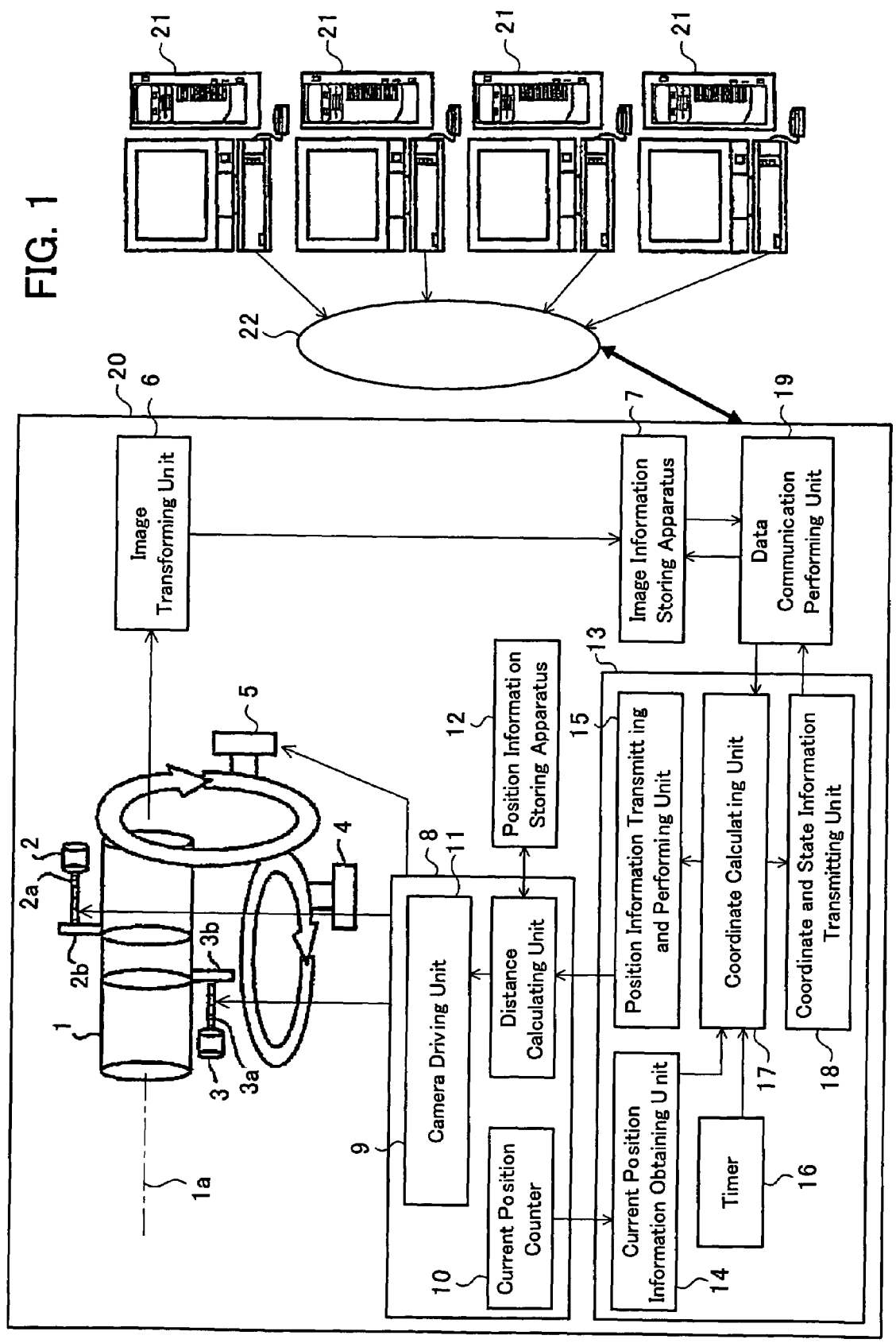
- FIG. 1 is a block diagram showing a first embodiment of the camera control system according to the present invention.
Figure 2:
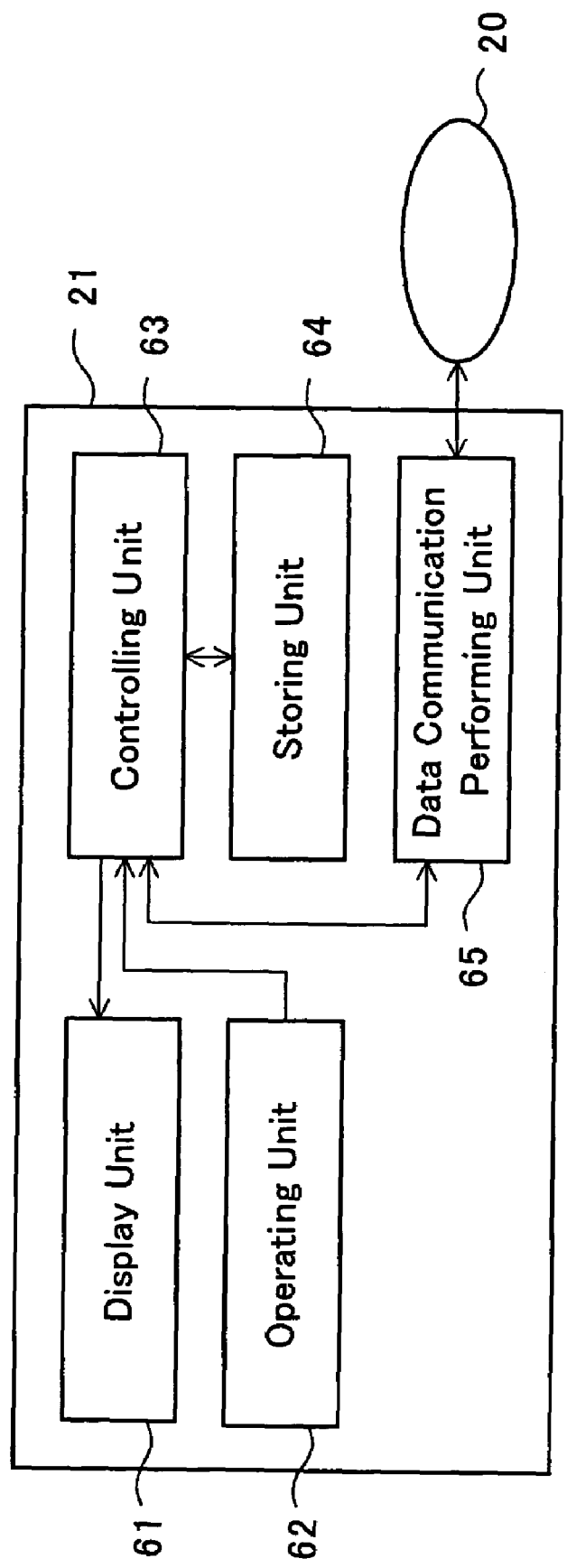
FIG. 2 is a block diagram showing a remote controlling apparatus of the camera control system according to the present invention.
Figure 3:
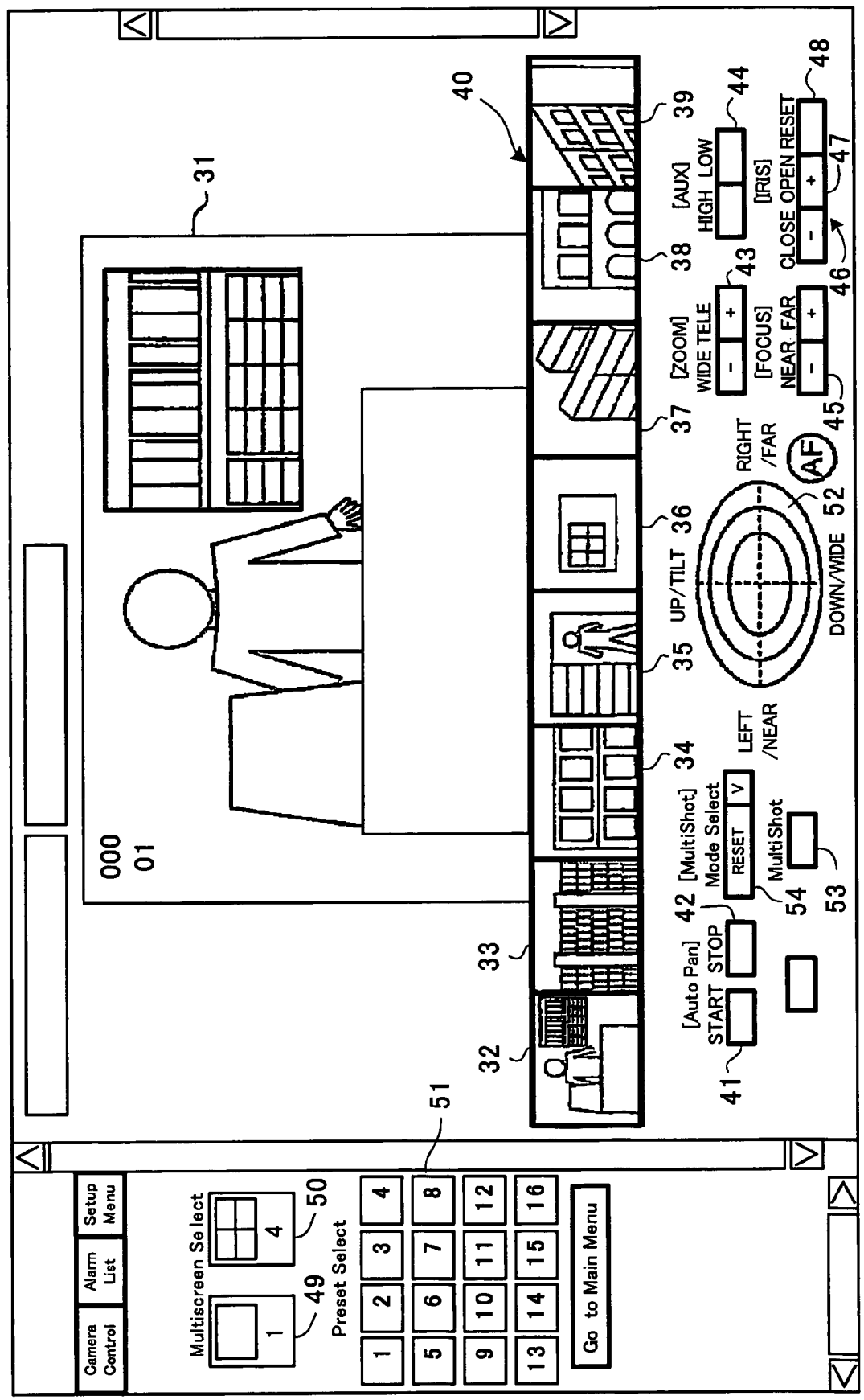
FIG. 3 is a schematic view showing a screen on which an image is being displayed, the screen forming part of the remote controlling apparatus of the camera control system according 15 to the first embodiment of the present invention.
Figure 4:
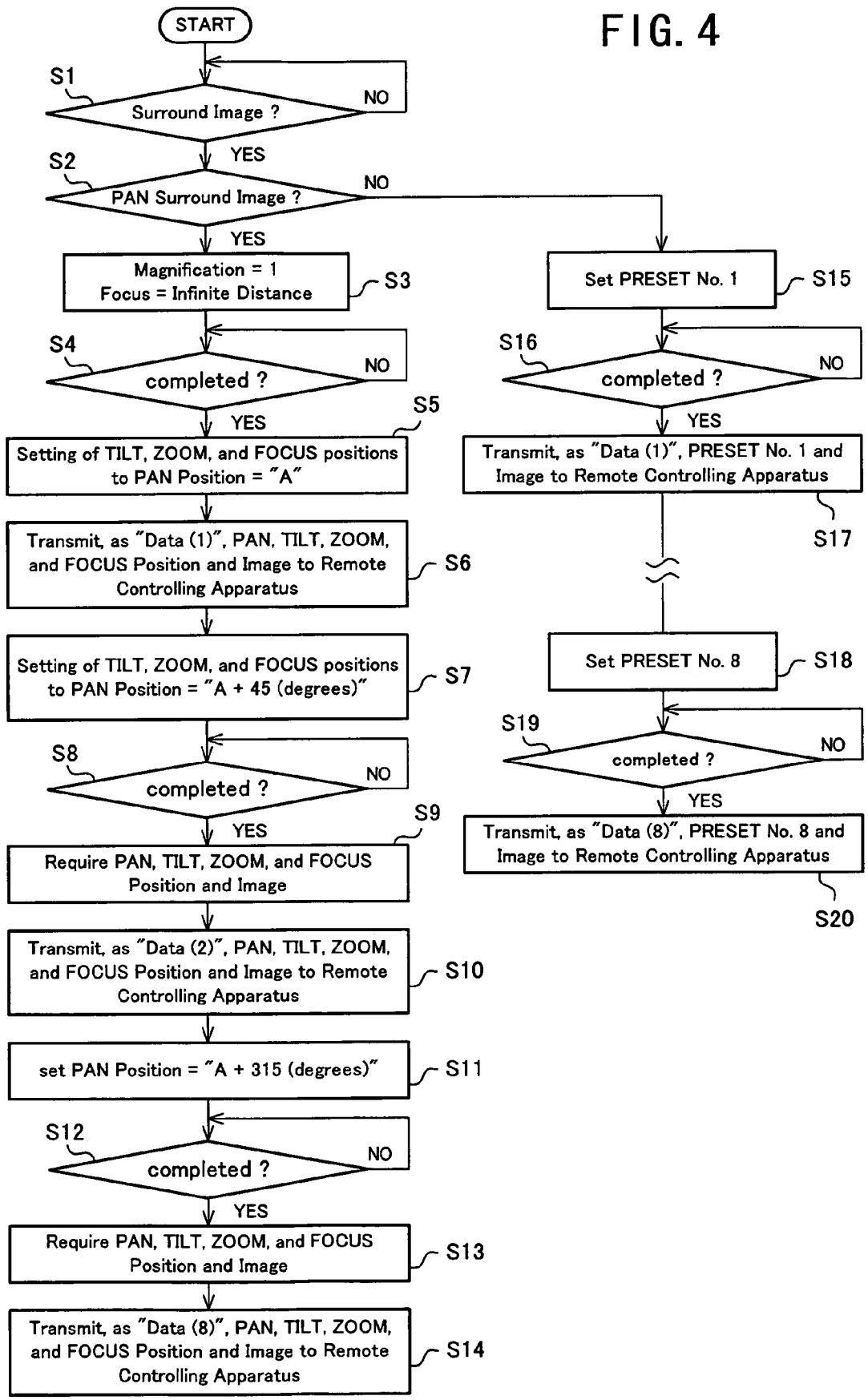
FIG. 4 is a flowchart showing a process in which the preset and panoramic images are taken in an area by the camera control system according to the first embodiment of the present invention.

Referring now to FIGS. 1 to 4 of the drawings, there is shown a first embodiment of the camera control system according to the present invention. FIG. 1 is a block diagram showing a first embodiment of the camera control system according to the present invention. FIG. 2 is a block diagram showing a remote controlling apparatus of the camera control system according to the first embodiment of the present invention. FIG. 3 is a schematic view showing a screen on which an image is being displayed, the screen forming part of the remote controlling apparatus of the camera control system according to the first embodiment of the present invention. FIG. 4 is a flowchart showing a process in which preset and panoramic images are taken in an area by the camera control system according to the first embodiment of the present invention.

The constitution of the first embodiment of the camera control system according to the present invention will be described in detail hereinafter. The imaging apparatus 20 is shown in FIG. 1 as comprising a camera 1 having a lens unit, a focus motor 2, a magnification motor 3, a horizontal motor 4, a vertical motor 5, an image transforming unit 6, an image information storing apparatus 7, a camera driving apparatus 8, a position information storing apparatus 12, a preset image obtaining apparatus 13, and a data communication performing unit 19.

The focus motor 2 is adapted to adjust the camera 1 in its focus, while the magnification motor 3 is adapted to adjust the camera 1 in its magnification. The focus motor 2 has a ball screw 2a, and a supporting plate 2b to be meshed with the ball screw 2a to support one lens section of the camera 1. The magnification motor 3 has a ball screw 3a, and a supporting plate 3b to be meshed with the ball screw 2a to support the other lens section of the camera 1. This means that the imaging apparatus 20 can adjust the camera 1 in each of the focus and magnification by having each of the lens sections moved in the direction of its optical axis.

The horizontal motor 4 is adapted to drive the camera 1 to have the camera 1 moved to its horizontal direction (around its PAN axis), while the vertical motor 5 is adapted to drive the camera 1 to have the camera 1 moved to its vertical direction (around its TILT axis). The camera driving apparatus 8 is adapted to drive each of the horizontal motor 4 and the vertical motor 5. The camera 1 has a camera sight line (hereinafter referred to as "optical axis") 1a to indicate a direction at which the camera 1 is pointed. The optical axis of the camera 1 is moved in each of the horizontal and vertical directions while the camera 1 is moved in each of the horizontal and vertical directions.

The image transforming unit 6 is adapted to transform the image taken by the camera 1 to a digital signal to be temporarily stored in the image information storing apparatus 7, while the data communication performing unit 19 is adapted to receive from the image information storing apparatus 7 the digital signal to be transmitted to the remote controlling apparatus 21 through the communication network 22. The image information storing apparatus 7 serves as a buffer memory which is small in memory capacity.

The camera driving apparatus 8 includes a camera driving unit 9 for driving, as a motor driver, each of the focus motor 2, the magnification motor 3, the horizontal motor 4, and the vertical motor 5. The camera driving apparatus 8 further includes a current position counter (camera position detecting means) 10 for obtaining position information indicative of a current position of the camera 1 (horizontal and vertical components of the current position of the optical axis of the camera 1), a distance calculating unit 11 for calculating a distance between the current position obtained by the current position counter 10 and any one (as one of specific positions) of first to nth positions represented by the position information stored in the position information storing apparatus 12 (position information storing means) to have the camera 1 moved to the specific position. The position information storing apparatus 12 has stored therein position information received from the remote controlling apparatus 21, while the remote controlling apparatus 21 is adapted to control the imaging apparatus 20 to ensure that the preset images are sequentially taken on the basis of the position information received from the remote controlling apparatus 21.

The preset image obtaining apparatus 13 is adapted to control the camera driving apparatus 8. The preset image obtaining apparatus 13 comprises a current position information obtaining unit 14, a position information transmitting and performing unit 15, a timer 16, a coordinate calculating unit 17, and a coordinate and state information transmitting unit 18.

The current position information obtaining unit 14 is adapted to obtain the position information indicative of the current position of the camera 1 from the current position counter 10, while the coordinate calculating unit 17 is adapted to allow the position information obtained by the current position information obtaining unit 14 to be linked to each of the image information indicative of the image taken at the current position and the optical condition (focus, zoom, autofocus, and others in which the camera 1 is adjusted at the current position). The data communication performing unit 19 is adapted to transmit the position information obtained by the current position information obtaining unit 14 to the remote controlling apparatus 21 when the judgment is made that the transition of the camera 1 to the next specific position from the current position is completed on the basis of the current position obtained by the current position counter 10.

The remote controlling apparatus 21 is adapted to transmit an instruction signal on the specific position (linked to any one of first to nth preset numbers) to which the camera 1 is moved from the current position, while the coordinate calculating unit 17 is adapted to calculate the focus and magnification of the camera 1 in response to the instruction signal received from the remote controlling apparatus 21 to transmit the optical condition information indicative of the calculated focus and magnification to the distance calculating unit 11 through the position information transmitting and performing unit 15. The distance calculating unit 11 is adapted to receive the position information indicative of the specific position from the position information storing apparatus 12 in response to the instruction signal to calculate a distance between the specific position and the current position.

The timer 16 is adapted to start to compute an elapsed time when the camera 1 starts to be moved toward the specific position from the current position, to keep computing the elapsed time while the camera 1 is being moved toward the specific position, the camera 1 is being adjusted in each of the focus and magnification, the preset image is being taken at that specific position by the camera 1, and the camera 1 is being moved toward a next specific position from the specific position, and to stop computing the elapsed time when the judgment is made that the next specific position is occupied by the camera 1. This means that the camera control system according to the present invention can prevent the camera 1 from being moved by the camera driving unit 9 until the next specific position is occupied by the camera 1 by judging whether or not the elapsed time is being computed by the timer 16. In this embodiment, the preset image obtaining apparatus 13 constitutes camera driving means.

The remote controlling apparatus 21 is electrically connected to the data communication performing unit 19 through a communication network 22. The remote controlling apparatus 21 is constituted by a personal computer which is shown in FIG. 2 as comprising a display unit 61, an operating unit 62, a controlling unit 63, a storing unit 64, and a data communication performing unit 65.

The display unit (display means) 61 is shown in FIG. 3 as having a screen which has an enlarged size image section 31 and a divided image section 40 having a plurality of image sections 32 to 39 (see FIG. 3, eight sections). The display unit 61 is adapted to display the image taken at the current position by the camera 1 on the enlarged size image section 31, and to display the images taken at the positions, each of which is specified in the horizontal and vertical directions, by the camera 1 on the divided image section 40. When, on the other hand, one of the images displayed on the divided image section 40 is selected by the remote controlling apparatus 21, the driving means 61 is adapted to allow the camera 1 to be moved to the position linked to the selected image to ensure that the image is taken at the position linked to the selected image to be enlarged and displayed on the enlarged size image section 31.

The controlling unit 63 is adapted to control the display unit 61 to ensure that the images taken at the positions by the camera 1 are displayed on the respective image sections 32 to 39 of the divided image section 40 on the basis of the positions at which these images are taken by the camera 1. When any one of the image sections 32 to 39 is selected by the remote controlling apparatus 21, the data communication performing unit 65 is adapted to transmit the position information indicative of the position linked to the image displayed on the selected image section or a preset number linked to the image displayed on the selected image section to the data communication performing unit 19 through the communication network 22.

When the position information or the preset number is received from the remote controlling apparatus 21 by the data communication performing unit 19, the preset image obtaining apparatus 13 is adapted to control the camera driving apparatus 8 in response to the position information or the preset number received from the remote controlling apparatus 21 to ensure that the optical axis of the camera 1 is moved to the next specific position, the lens unit of the camera 1 being adjusted on the basis of the calculated focus and magnification, and the preset image being taken at that specific position by the camera 1. The data communication performing unit 19 is adapted to transmit the preset image taken at the specific position to the remote controlling apparatus 21 in response to the position information or the preset number.

As shown in FIG. 3, the images indicative of a cash register, shelves, or other objects disposed in a convenience store are displayed on the respective image sections 32 and 39. The image indicative of the cash register, and displayed on the image section 32, is enlarged and displayed on the an enlarged size image section 31.

The display unit 61 is adapted to display an image partially indicative of the operating unit 62 on a display area of the screen. The operating unit 62 includes a start switch 41 having the camera 1 automatically moved in the horizontal direction, a stop switch 42 having the camera 1 stop being moved in the horizontal direction, a magnification adjusting switch 43 for allowing the camera 1 to be adjusted in magnification, an assist switch 44, a focus adjusting switch 45 for allowing the camera 1 to be adjusted in focus, an iris closing switch 46 for allowing the iris of the camera 1 to be closed, an iris opening switch 47 for allowing the iris of the camera 1 to be opened, an iris resetting switch 48 for allowing the iris of the camera 1 to be reset, a PAN/TILT controller 52 for allowing each of the horizontal motor 4 and the vertical motor 5 to be manually driven by the camera driving apparatus 8, a panoramic image acquiring switch 53 having the camera 1 take a panoramic image, and a mode switch 54 for switching between two different modes including a preset mode in which the images are sequentially taken by the camera 1, and a surrounding mode in which the panoramic image is taken by the camera 1.

The operating unit 62 further includes one image display switch 49 for allowing one image to be displayed on the enlarged size image section 31, four image display switch 50 for allowing four images to be collectively displayed on the enlarged size image section 31, and an operation keys 51 to be linked to the preset positions, each of the operation keys 51 is adapted to allow the camera 1 to be moved to the respective preset positions. The image displayed on the display area includes icons respectively indicative of the switches, controller, and keys of the operating unit 62.

The position information storing apparatus 12 has stored therein each of the position information and the optical condition information, while the camera driving apparatus 8 is adapted to receive each of the position information and the optical condition information from the position information storing apparatus 12 in response to the selected preset number to have the camera 1 moved to the preset position linked to the selected preset number. The storing unit 64 of the remote controlling apparatus 21 has stored therein the images (still image) to be displayed on the respective image sections 32 to 39, the preset positions linked to the respective preset images, and the preset numbers linked to the respective image sections 32 to 39. In this embodiment, the storing unit 64 constitutes position information storing means and image information storing means.

The operation keys 51 includes a plurality of numeral keys "1" to "16". In this embodiment, the position information storing apparatus 12 has first to sixteenth storage sections linked to the respective numeral keys "1" to "16". Each of the storage sections of the position information storing apparatus 12 has the position information indicative of the respective preset position. When any one key is selected from among the numeral keys "1" to "16", the data communication performing unit 65 of the remote controlling apparatus 21 is adapted to extract the position information from the storage section linked to the selected number key, and to transmit the extracted position information to the imaging apparatus 20. The preset image obtaining apparatus 13 are adapted to control the camera driving apparatus 8 to have the optical axis of the camera 1 moved toward the specific position on the basis of the positions information, and the preset image is taken at the specific position by the camera 1.

The operating unit 62 of the remote controlling apparatus 21 includes a keyboard (not shown) having inputted therein descriptive information on each of the image sections 32 to 39 of the divided image section 40, and a mouse (not shown) for selecting one image section from among the image sections 32 to 39 of the divided image section 40. The display unit 61 of the remote controlling apparatus 21 is adapted to superimpose the inputted descriptive information on each of the image sections 32 to 39 of the divided image section 40. In FIG. 3, the descriptive information is not superimposed on each of the images displayed on the image sections 32 to 39. The descriptive information such as for example "cash register" and "department of bottled water", however, may be superimposed on each of the images displayed on the image sections 32 to 39. When any one of the image sections 32 to 39 is cricked by the mouse, the display unit 61 is adapted to enlarge and display the image displayed on the cricked image section on the enlarged size image section 31. In this embodiment, the display unit 61 and the operating unit 62 collectively constitute image section switching means. The operating section constitutes inputting means.

The coordinate calculating unit 17 is adapted to receive the position information indicative of the positions linked to the respective images displayed on the image sections 32 to 39 of the divided image section 40 from the position information storing apparatus 12 at predetermined time intervals to ensure that the preset images are sequentially taken at the respective positions by the camera 1, and the preset images displayed on the divided image section 40 are updated by the display unit 61.

When the preset image requiring signal is received by the imaging apparatus 20 from the remote controlling apparatus 21, the preset image obtaining apparatus 13 is adapted to control the camera driving apparatus 8 on the basis of the position information received from the position information storing apparatus 12 to have the camera 1 sequentially moved to the designated positions, the preset images are taken at the designated positions by the camera 1, and the preset images taken by the camera 1 are transmitted to the remote controlling apparatus 21. On the other hand, the controlling unit 63 is adapted to control the display unit 61 to ensure that the preset images displayed on the image sections 32 and 39 of the divided image section 40 are updated to the last images received from the imaging apparatus 20.

When the judgment is made that the panoramic image is required by the controlling unit 63, the camera driving apparatus 8 may be adapted to control the pan and vertical motors 4 and 5 to have the camera 1 moved at even intervals. The controlling unit 63 is adapted to require the viewing angle information on a viewing angle of the lens unit of the camera 1 from the imaging apparatus 20. On the other hand, the imaging apparatus 20 is adapted to receive from the camera 1 the viewing angle information to be transmitted to the remote controlling apparatus 21. The coordinate calculating unit 17 is adapted to calculate the distance of the horizontal or vertical direction on the basis of the viewing angle information received from the imaging apparatus 20 to have the camera 1 moved in response to the calculated distance.

The following description will be directed to a method in which the surrounding image is taken by the camera 1 on the basis of the flowchart shown in FIG. 4 under the condition that the camera 1 is moved in the horizontal direction, and sequentially pointed at eight directions.

The judgment is firstly made on whether or not the surrounding image acquiring switch 53 of the operating unit 62 of the remote controlling apparatus 21 is operated by the operator (in the step S1). When the answer in the step S1 is in the affirmative "YES", i.e., the surrounding image acquisition switch 53 of the operating unit 62 of the remote controlling apparatus 21 is operated by the operator, the judgment is made whether the image (PAN surrounding image) is taken in the horizontal direction or the preset image is taken in the horizontal direction (in the step S2).

When, for example, the judgment is made that the surrounding image is taken in the horizontal direction, the camera driving unit 9 is operated to drive each of the focus motor 2 and the magnification motor 3 to ensure that the magnification of the lens unit is set to a numeral "1", and the focus of the lens unit is set to an infinite distance (in the step S3).

The judgment is made on whether or not the lens unit is being adjusted in the magnification and focus (in the step S4). When the answer in the step S4 is in the negative "NO", i.e., the adjustment of the camera 1 is entirely finished, the current position counter 10 is operated to detect the coordinates of the position "A" of camera 1 in each of the horizontal and vertical directions "P" and "T", and to detect the magnification and focus of the lens unit (in the step S5).

The data indicative of each of the initial position "A" and the optical condition is then transmitted to the remote controlling apparatus 21 through the data communication performing unit 19, while the image is converted to the digital image data to be stored by the image information storing apparatus 7, and to be transmitted to the remote controlling apparatus 21 through the data communication performing unit 19.

When the "data (1)" is received by the data communication performing unit 65 of the remote controlling apparatus 21, the "data (1)" received by the data communication performing unit 65 is stored in the storing unit 64 in association with each of the position information and the optical condition information.

After the above mentioned process, the steps S3 to S6 are repeated in order to have the camera 1 moved to the position "A+45" from the position "A" (in the step S7). The camera 1 is moved with the angle of 45 degrees in the horizontal direction by the horizontal motor 4. The judgment is made on whether or not the optical axis of the camera 1 is moved with the angle of 45 degrees to the position "A+45" from the position "A" (in the step S8). When the optical axis of the camera 1 is moved to the position "A+45", the current position counter 10 is operated to detect the coordinates of the position "A+45" of camera 1 in each of the horizontal and vertical directions "P" and "T", and to detect the magnification and focus of the lens unit (in the step S9).

The position information, the optical condition information, and the image information are transmitted as "data (2)" to the remote controlling apparatus 21 through the data communication performing unit 19 (in the step S10).

When the "data (2)" is received by the data communication performing unit 65 of the remote controlling apparatus 21, the "data (2)" received by the data communication performing unit 65 is stored in the storing unit 64 in association with each of the position information and the optical condition information.

The above mentioned process is repeated every 45 degrees until the camera 1 is moved to the position "A+315" (in the step S11). The camera 1 is moved with the angle of 45 degrees in the horizontal direction by the horizontal motor 4. The judgment is made on whether or not the optical axis of the camera 1 is moved with the angle of 315 degrees to the position "A+315" (in the step S12). When the optical axis of the camera 1 is moved to the position "A+315", the current position counter 10 is operated to detect the coordinates of the position "A+315" of camera 1 in each of the horizontal and vertical directions "P" and "T", and to detect the magnification and focus of the lens unit (in the step S13).

The position information, the optical condition information, and the image information are transmitted as "data (8)" to the remote controlling apparatus 21 through the data communication performing unit 19 (in the step S14).

When the "data (8)" is then received by the data communication performing unit 65 of the remote controlling apparatus 21, the "data (8)" received by the remote controlling apparatus 21 is stored in the storing unit 64 in association with each of the position information and the optical condition information.

In the remote controlling apparatus 21, the eight images are displayed on respective image sections 32 to 39 of the divided image section 40 (see FIG. 3) on the basis of the position information stored in the storing unit 64.

When, for example, the image section 32 is selected from among the image sections 32 to 39 by the mouse of the operating unit 62, the instruction signal for requiring the position linked to the image displayed on the selected image section 32 is transmitted to the imaging apparatus 20, the optical axis of the camera 1 is moved to the position in response to the instruction signal. The image is then taken at the position by the camera 1, then transmitted to the remote controlling apparatus 21, and then displayed on the enlarged image section 31.

The following description will then be directed to a method in which the preset image is taken by the camera 1 when the remote controlling apparatus 21 is operated to select one position from among the positions linked to the above mentioned image sections 32 to 39. Here, the number of the preset images taken by the camera 1 and the number of the positions will not described in detail hereinafter. However, the number of the preset images and the number of the positions may be arbitrarily determined if necessary. The determined number of the images are sequentially taken at the positions of the determined number.

As shown in FIG. 4, the preset number "1" is firstly selected from among the preset numbers "1" to "8" when the panoramic image is not taken by the camera 1, and the preset images are taken by the camera 1. When the answer in the step S2 is in the negative "NO", i.e., the PAN surround image is not being required by the remote controlling apparatus 21 (in the step S15).

The distance calculating unit 11 is then operated to receive the position information from the position information storing apparatus 12 in response to the selected preset number "1". The distance between the specific position received from the position information storing unit 12 and the current position of the optical axis of the camera 1 detected by the current position counter 10 is then calculated by the distance calculating unit 11. The camera 1 is then moved on the basis of the distance calculated by the distance calculating unit 11, while the lens unit of the camera 1 is adjusted on the basis of the calculated focus and magnification. The judgment is made on whether or not the specific position is occupied by the camera 1 in response to the preset number "1" (in the step S16). When the specific position is occupied by the camera 1 in response to the preset number "1", the preset image is taken at the specific position by the camera 1. The remote controlling apparatus 21 is then operated to receive the preset image taken at the specific position with the preset number "1" as "data (1)" (in the step S17).

In a uniform manner, the second to seventh images are sequentially taken in response to the respective preset numbers "2" to "7". The eighth image is finally taken in response to the preset number "8" (in the step S18).

When the preset number "8" is selected (in the step S18), the distance calculating unit 11 is operated to receive the position information of the specific position linked to the preset number "8" from the position information storing apparatus 12, and to calculate the distance between the specific position and the current position of the optical axis 1a of the camera 1 detected by the current position counter 10. The camera driving unit 9 is then operated to allow the camera 1 to be moved to the specific position on the basis of the distance calculated by the distance calculating unit 11, and to allow the camera 1 to be adjusted in each of focus and magnification.

The judgment is then made on whether or not the transition of the camera 1 to the next specific position from the current position is completed (in the step S19). When the answer in the step S19 is in the affirmative "YES", i.e., the transition of the camera 1 to the next specific position from the current position is completed, the image is taken at that specific position by the camera 1. The image taken at that specific position are transmitted with the preset number as "data (8)" to the remote controlling apparatus 21 (in the step S20).

The "data (1)" to "data (8)" are received from the imaging apparatus 20 by the data communication performing unit 65 of the remote controlling apparatus 21, and stored in the storing unit 64 of the remote controlling apparatus 21.

The first to eighth images taken at the first to eighth specific positions are displayed on the respective image sections 32 to 39 linked to the first to eighth specific positions represented by the position information stored in the storing unit 64. Here, the descriptive information may be superimposed on each of the first to eighth images displayed on the image sections 32 to 39.

When the instruction signal for requiring the images to be taken at the specific positions is received from the remote controlling apparatus 21, the position information received from the position information storing apparatus 12 by the coordinate calculating unit 17 in response to the images displayed on the image sections 32 to 39. The camera 1 is moved on the basis of the position information received by the coordinate calculating unit 17 when the images are sequentially taken by the camera 1 in response to the instruction signal.

When the first to eighth preset images are sequentially taken again by the camera 1 on the basis of the position information received by the coordinate calculating unit 17, the preset image obtaining apparatus 13 is operated to drive the camera driving apparatus 8 to have the camera 1 sequentially moved to the specific positions represented by the position information received by the coordinate calculating unit 17. The preset images taken again by the camera 1 are then transmitted to the remote controlling apparatus 21. The controlling unit 63 is then operated to receive, as last preset images, the preset images to be displayed on the image sections 32 to 39 of the divided image section 40 from the imaging apparatus 20, while the preset images displayed on the image sections 32 to 39 are respectively updated to the last preset images received from the imaging apparatus 20.

In this embodiment, the camera 1 is moved to each of the specific positions with the angle of 45 degrees when the panoramic image is taken by the camera 1. Here, this angular distance 45 degrees is determined on the basis of the viewing angle of the camera 1 under the condition that the camera 1 is adjusted in magnification with a numeral "1", and adjusted in focus with an infinite distance (in the step S3). This means that the panoramic image can be seamlessly produced from the images taken at the specific positions under the condition that the camera 1 is moved to each of the specific positions with the angle of 360 degrees/8. However, the angular distance may be arbitrarily determined by the remote controlling apparatus 21 of the camera control system according to the present invention.

From the above detail description, it will be understood that the camera control system according to the first embodiment of the present invention can allow an operator to obtain a good grasp of the area by allowing the operator to watch the images taken in the area, and collectively displayed on the divided image section 40 by reason that the current position counter 10 is adapted to detect the current position of the camera 1, the image information storing apparatus 7 has stored therein the image information indicative of the images taken at the specific positions under the condition that the image is linked to the position, to allow the images sequentially taken at the respective positions by the camera 1 to be collectively displayed on the divided image section 40 linked to the positions. The camera control system according to the first embodiment of the present invention can enhance its operational performance without initial condition information on the positions by reason that the position of the camera 1 is automatically detected by the position detecting means when the camera 1 is moved in the horizontal and vertical directions.

The camera control system according to the first embodiment of the present invention can allow an operator to easily obtain a good grasp of the area by allowing the operator to watch the preset images taken in the area, and collectively displayed on the divided image section 40 by reason that the imaging apparatus is adapted to allow the camera 1 to be moved on the basis of the position information and the optical condition information on the focus and magnification stored in the position information storing apparatus 12 to ensure that the preset images are sequentially taken, collectively displayed on the divided image section 40.

The camera control system according to the first embodiment of the present invention can, when the judgment is made that an image of a suspicious person is being displayed on any one of the image sections 32 to 39 of the divided image section 40, display that image on the enlarged image section 31 by reason that the display unit 61 has a screen having an enlarged image section 31 to allow the camera 1 to be moved to a position specified on the basis of that judgment, and to allow the camera 1 to take a moving image to be displayed on the enlarged image section. This means that the camera control system thus constructed as previously mentioned can easily switch the image between the enlarged image section and the divided image section 40 to enhance the security.

The camera control system according to the first embodiment of the present invention can allow an operator to easily obtain a good grasp of the area by allowing the operator to watch the preset images taken in the area, collectively displayed on the divided image section 40 by reason that the remote controlling apparatus 21 is adapted to control the imaging apparatus on the basis of the position information at predetermined time intervals to allow the camera 1 to be sequentially moved to the specific positions, and to have the camera 1 take the images to be collectively displayed on the divided image section 40 in response to the respective specific positions.

The storing means of the imaging apparatus 20 of the camera control system according to the present invention can be small in memory size by reason that the remote controlling apparatus 21 comprises a storing unit 64 having stored therein position information 35 indicative of the positions and image information indicative of the images taken at the positions by the camera 1 to ensure that the positions of the image information are respectively linked to the images of the image information. This leads to the fact that the imaging apparatus of the camera control system according to the first embodiment of the present invention can be small in production cost.

Even if the camera control system according to the first embodiment of the present invention comprises a plurality of remote controlling apparatuses each of controlling the imaging apparatus 20 to ensure that the images are taken at the positions by the camera, each of the remote controlling-apparatuses comprising a storing unit having stored therein position information indicative—of the positions and image information indicative of the images taken at the positions by—the camera 1 to ensure that the positions of the image information are respectively linked to the images of the image information, the storing means of the imaging apparatus of the camera control system according to the first embodiment of the present invention can be small in memory size.

The camera control system according to the first embodiment of the present invention can allow the remote controlling apparatus 21 to display the images taken in respective directions by the camera 1 of the imaging apparatus 20 on the divided image section 40 as a panoramic image by—reason that the imaging apparatus 21 is adapted to calculate the distance between the current position and the specific position on the basis of the viewing angle of the lens unit of-die camera 1, the camera driving apparatus is adapted to drive each of the horizontal and vertical motors to have the camera 1 moved on the basis of the distance when the images are taken as the panoramic image at the respective positions by the camera 1. Even if the imaging apparatus is controlled by each of remote controlling apparatuses, the camera control system according to the first embodiment of the present invention can allow the remote controlling apparatuses to display respective panoramic images on the respective divided image section 40 by reason that each of the remote controlling apparatuses includes a storing unit 64 having stored therein image information indicative of the images to be collectively displayed as the panoramic image.

The camera control system according to the first embodiment of the present invention can allow the operator to simply obtain a good grasp of the area by allowing the operator to watch the images displayed on the image sections 32 to 39 of the divided image section 40 by reason that the descriptive information is superimposed on each of the images displayed on the image sections 32 to 39 of the divided image section 40 and the image displayed on the enlarged image section 31. For example, the operator can immediately go straight to the area if necessary.

For example, the position information and the image information may be respectively stored in the position information storing apparatus 12 and the image information storing apparatus 7 before the position information and the image information are received from the position information storing apparatus 12 and the image information storing apparatus 7 by the remote controlling apparatus 21 if necessary. In other words, the position information and the image information may be stored in the imaging apparatus 20, or the remote controlling apparatus 21.

In this embodiment, the current position counter 10 of the imaging apparatus 20 constitutes position detecting means for detecting the current position of the camera 1. The remote controlling apparatus 21, however, may be adapted to detect the current position of the camera 1.

Second Embodiment

Figure 5:
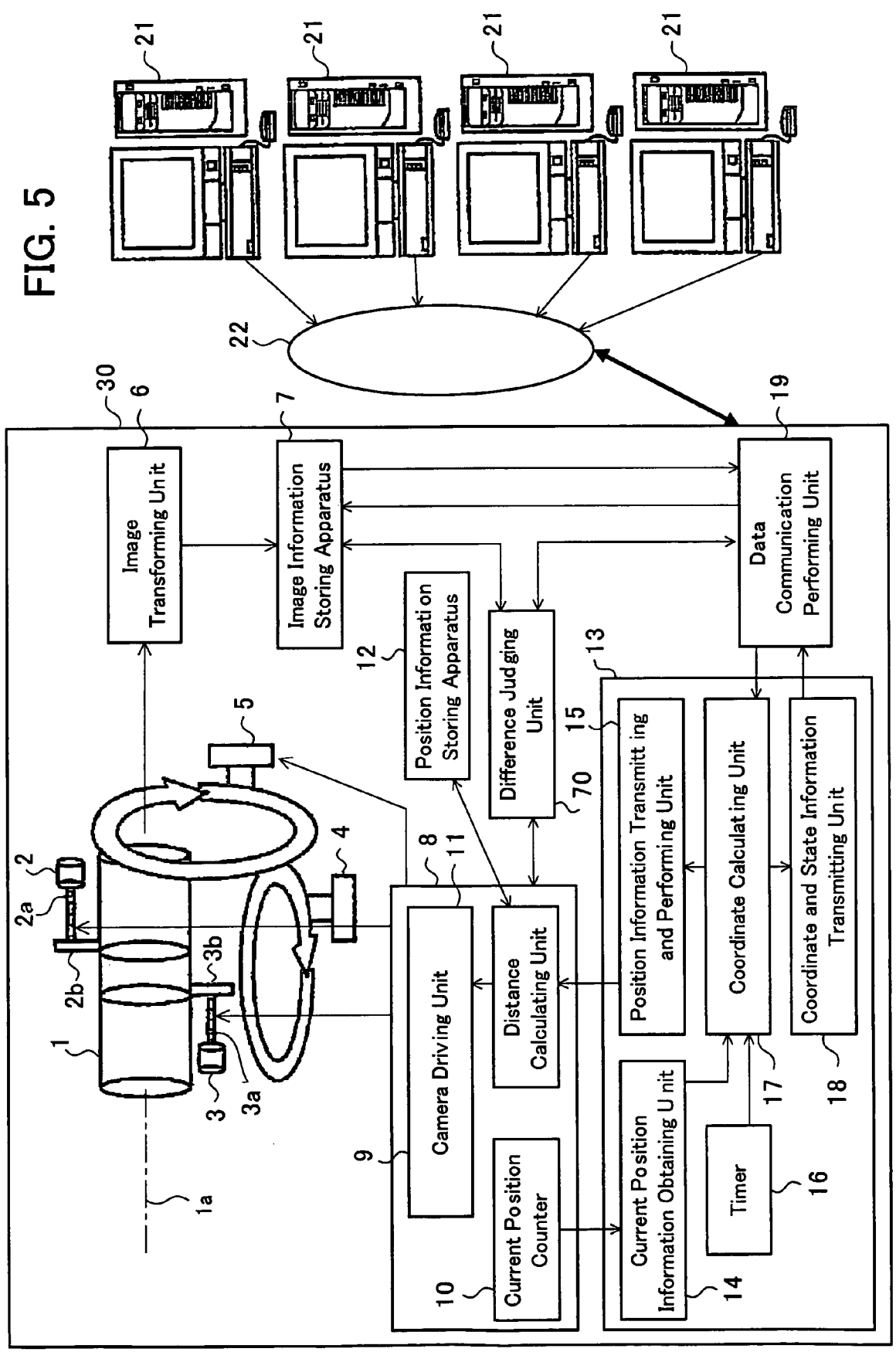
FIG. 5 is a block diagram showing an camera control system according to the second 20 embodiment of the present invention.

Referring to FIG. 5, there is provided an camera control system according to the second embodiment of the present invention. The constitutional elements of the second embodiment are substantially the same as those of the first embodiment except for the constitutional elements appearing in the following description. Therefore, the constitutional elements of the second embodiment the same as those of the first embodiment will not be described but bear the same reference numerals and legends as those of the first embodiment.

The imaging apparatus 30 is shown in FIG. 5 as further comprising, in addition to the constitutional elements of the imaging apparatus 20 according to the first embodiment of the present invention, a difference judging apparatus 70 for controlling each of the camera driving apparatus 8 and the preset image obtaining apparatus 13 to have the camera 1 moved to each of the specific positions at predetermined time intervals to ensure that the images are sequentially taken at each of the specific positions. The difference judging apparatus 70 is adapted to store image information indicative of the images sequentially taken at each of the specific positions in the image information storing apparatus 7, and to judge whether or not the current image is substantially different from the prior image in each of the specific positions. When, for example, the judgment is made that the current image taken at this moment is substantially different from each of the prior images stored in the image information storing apparatus 7 at current position, the difference judging apparatus 70 is adapted to transmit a notification signal to the remote controlling apparatus 21 through the data communication performing unit 19 with position information indicative of that current position. When the notification signal is received by the remote controlling apparatus 21 from the imaging apparatus 30 through the data communication performing unit 65, the controlling unit 63 of the remote controlling apparatus 21 is adapted to control the display unit 61 to have the display unit 61 enlarge and display the image taken at that current position on the enlarged size image section in response to the notification signal received from the imaging apparatus 30. The remote controlling apparatus 21 further comprises a speaker unit (not shown) for producing a buzzer sound in response to the notification signal received from the imaging apparatus 30.

The imaging apparatus 30 according to the second embodiment of the present invention, in addition to the advantage of the first embodiment, can immediately transmit the notification signal to the remote controlling apparatus when, for example, the judgment is made that the current image taken at this moment is substantially different from each of the prior images stored in the image information storing apparatus 7 at current position by reason that the imaging apparatus 30 comprises a difference judging apparatus 70 for controlling each of the camera driving apparatus 8 and the preset image obtaining apparatus 13 to have the camera 1 moved to each of specific positions at predetermined time intervals to ensure that the images are sequentially taken at each of the specific positions, to judge whether or not the current image is substantially different from the prior image in each of the specific positions, and to transmit a notification signal to the remote controlling apparatus 21 through the data communication performing unit 19 with position information indicative of that current position when the judgment is made that the current image taken at this moment is substantially different from each of the prior images stored in the image information storing apparatus 7 at that current position.

When the judgment is made that the current image taken at this moment is substantially different from each of the prior images stored in the image information storing apparatus 7, the imaging apparatus 30 according to the second embodiment of the present invention can allow an operator to immediately obtain a good grasp of the area by allowing the operator to watch the image, taken at that position, and displayed on the enlarged size image section by reason that the controlling unit 63 is adapted to control the display unit 61 to have the display unit 61 enlarge and display the image taken at that position on the enlarged size image section in response to the notification signal received from the imaging apparatus 30, and the remote controlling apparatus 21 further comprises a speaker unit for producing a buzzer sound in response to the notification signal received from the imaging apparatus 30.

While there has been described in the forgoing embodiment about the fact that the remote controlling apparatus 21 of the camera control system according to the second embodiment of the present invention further comprises a speaker unit for producing a buzzer sound in response to the notification signal received from the imaging apparatus 30 through the data communication performing unit 65, the remote controlling apparatus 21 may further comprise a light emitting unit for producing and emitting a light blinking on and off as a security information to be immediately received by the operator.

In this embodiment, the imaging apparatus 30 of the camera control apparatus according to the second embodiment of the present invention further comprises a difference judging apparatus 70. The remote controlling apparatus, however, may further comprises a difference judging apparatus to be electrically connected to each of the controlling unit 63 and the storing unit 64. In this case, the difference judging apparatus is adapted to control each of the camera driving apparatus 8 and the preset image obtaining apparatus 13 to have the camera 1 moved at the predetermined time intervals to ensure that the images are sequentially taken at the respective positions. The difference judging apparatus is adapted to judge whether or not the current image is substantially different from the prior image in each positions, and to transmit to the remote controlling apparatus 21 through the data communication performing unit 19 a notification signal with position information on a position in which the current image is substantially different from the prior image. When, on the other hand, the notification signal is received by the remote controlling apparatus 21 from the imaging apparatus 30 through the data communication performing unit 65, the controlling unit 63 is adapted to control each of the display unit 61 and the storing unit 64 to enlarge and display on the enlarged size image section the image linked to a position specified by the notification signal, and to have the speaker unit produce a buzzer sound in response to the notification signal.

INDUSTRIAL APPLICABILITY OF THE PRESENT INVENTION

In accordance with the present invention, there is provided an camera control system which can enhance its operational performance with no initial setup on specific positions each to be occupied by the camera to allow the operator to easily and immediately obtain a good grasp of the area by allowing the operator to watch the images collectively displayed on the divided image section or the image displayed on the enlarged size image section.

What is claimed is:

1. A camera control system, comprising:
a camera to be disposed in a remote place, said camera having an optical axis;
driving means for driving said camera to have said optical axis of said camera moved in each of horizontal and vertical directions;
position detecting means for detecting a position of said optical axis of said camera in each of said horizontal and vertical directions;
position information storing means for storing position information indicative of positions to which said camera is angularly moved; and
remote controlling apparatus to be electrically connected to said driving means through a communication network, said remote controlling apparatus including a mouse and display means having a screen, wherein
said screen has an enlarged size image section and divided image sections,
said remote controlling apparatus controls said driving means to ensure that said camera is angularly moved in said horizontal and vertical directions, said camera takes images corresponding to said positions, said images are displayed on said divided image sections.
said positions are linked to said respective images displayed on said divided image section,
said driving means moves said camera on the basis of said position information at regular time intervals to ensure that said images displayed on said divided image section are updated to images taken by said camera,
when said images displayed on said divided image sections are selectively clicked
by said mouse, said driving means moves said camera to a position linked to an image clicked by said mouse to ensure that said camera moved to said position linked to said image clicked by said mouse takes a moving image, and said display means displays, on said enlarged size image section, said moving image taken by said camera moved to said position linked to said image clicked by said mouse.

2. A camera control system as set forth in claim 1, which further comprises:
position registering means for registering said position detected by said position detecting means with an optical condition of said camera, and in which
said driving means is adapted to drive said camera on the basis of said registered position and optical condition.

3. A camera control system as set forth in claim 1, which further comprises image switching means for allowing said display means to display a moving image taken at said selected position by said camera to have said moving image displayed on said enlarged image section, said image switching means, when one of said images displayed on said divided image section is selected, being adapted to allow said camera to be moved and occupy a position linked to said selected image.

4. A camera control system as set forth in claim 1, which further comprises:
image information storing means for storing image information indicative of said images taken by said camera at said positions to have said stored images linked to said respective positions.

5. A camera control system as set forth in claim 1, in which
said remote controlling apparatus is adapted to control said driving means to have said camera take images at predetermined time intervals at said positions, which further comprises
difference detecting means for detecting differences of said images in each position, and in which
said remote controlling apparatus is adapted to produce a notification signal on said differences detected by said difference detecting means.

6. A camera control system as set forth in claim 5, in which
said displaying means of said remote controlling apparatus is adapted to enlarge said image linked to a position in which said difference of said images is detected by said difference detecting means, and to display said enlarged image on said enlarged image section.

7. A camera control system as set forth in claim 1, in which
said remote controlling apparatus is adapted to obtain viewing angle information on a viewing angle of a lens unit of said camera to calculate a distance in each of said horizontal and vertical directions on the basis of said viewing angle information.

8. A camera control system as set forth in claim 1, in which
said remote continuing apparatus further includes inputting means for inputting descriptive information on said images taken at said respective positions, and
said display means is adapted to superimpose said descriptive information inputted by said inputting means on said respective images to be displayed on said divided image section or said enlarged image section.

* * * * *